(12) United States Patent
D'Alfonso et al.

(10) Patent No.: US 12,415,717 B2
(45) Date of Patent: Sep. 16, 2025

(54) WRAP, SYSTEM, AND METHOD FOR THE REPAIR OF GAS STATION FUEL PUMP ISLANDS AND THE LIKE

(71) Applicant: COUNTRYSIDE CONCRETE SERVICES LTD., Lasalle (CA)

(72) Inventors: Augusto D'Alfonso, Harrow (CA); Marco D'Alfonso, Lasalle (CA)

(73) Assignee: COUNTRYSIDE CONCRETE SERVICES LTD., Lasalle (CA)

( * ) Notice: Subject to any disclaimer, the term of this patent is extended or adjusted under 35 U.S.C. 154(b) by 597 days.

(21) Appl. No.: 17/964,960

(22) Filed: Oct. 13, 2022

(65) Prior Publication Data

US 2023/0123411 A1    Apr. 20, 2023

Related U.S. Application Data

(60) Provisional application No. 63/256,255, filed on Oct. 15, 2021.

(51) Int. Cl.
*E01F 1/00* (2006.01)
*B60S 5/02* (2006.01)
*B67D 7/06* (2010.01)
*E01C 11/22* (2006.01)

(52) U.S. Cl.
CPC .................. *B67D 7/06* (2013.01); *B60S 5/02* (2013.01); *E01C 11/222* (2013.01)

(58) Field of Classification Search
CPC . E01C 11/222; B67D 7/06; B60S 5/02; E01F 1/00
USPC ........................................................ 404/7, 8
See application file for complete search history.

(56) References Cited

U.S. PATENT DOCUMENTS

| | | | | |
|---|---|---|---|---|
| 2,294,855 A | * | 9/1942 | Thomason | E01F 1/00 404/8 |
| 2,298,378 A | * | 10/1942 | Hodges | E01F 1/00 362/152 |
| 2,767,626 A | * | 10/1956 | Rooke | E01F 1/00 52/612 |

(Continued)

FOREIGN PATENT DOCUMENTS

GB    1344718 A  *  1/1974  ............ E01C 11/222

*Primary Examiner* — Raymond W Addie
(74) *Attorney, Agent, or Firm* — CONNEELY PC; Joseph Conneely

(57) ABSTRACT

A method for repairing a damaged band of a fuel pump island, comprising: selecting among preformed band pieces to form a replacement band system for the fuel pump island, wherein the preformed band pieces include one or more of a straight band piece for covering a straight portion of a vertical wall of the fuel pump island, an outside corner band piece for covering an outside corner portion of the vertical wall of the fuel pump island, and an inside corner band piece for covering an inside corner portion of the vertical wall of the fuel pump island; preparing the fuel pump island by removing debris from the vertical wall and a top surface of the fuel pump island; installing the replacement band system over the damaged band of the fuel pump island by attaching respective wall portions of the preformed band pieces to the vertical wall of the fuel pump island; and, finishing a top surface of the fuel pump island to at least a height that is level with top surfaces of respective flange portions of the preformed band pieces.

20 Claims, 10 Drawing Sheets

(56) References Cited

U.S. PATENT DOCUMENTS

| | | | | |
|---|---|---|---|---|
| 3,242,834 | A * | 3/1966 | Sondheim | E01C 19/502 404/8 |
| 3,379,105 | A * | 4/1968 | Lynch | E01C 11/222 404/8 |
| 5,700,106 | A * | 12/1997 | Young | E01F 1/00 404/8 |
| 6,010,276 | A * | 1/2000 | Young | E01F 1/00 404/8 |
| 6,099,202 | A * | 8/2000 | Walton | E01F 1/00 404/8 |
| 6,409,422 | B1 * | 6/2002 | Mittermaier | E01C 11/222 249/188 |
| 7,950,872 | B2 * | 5/2011 | Radu, Jr. | E01F 1/00 249/4 |
| 8,985,892 | B1 * | 3/2015 | Hunter | E01F 1/00 404/8 |
| 8,985,894 | B1 * | 3/2015 | Hunter | E01F 1/00 404/8 |
| 2009/0113828 | A1 * | 5/2009 | Radu, Jr. | E01F 1/00 52/745.19 |

\* cited by examiner

WRAP, SYSTEM, AND METHOD FOR THE REPAIR OF GAS STATION FUEL PUMP ISLANDS AND THE LIKE

This application claims priority from and the benefit of the filing date of U.S. Provisional Patent Application No. 63/256,255, filed Oct. 15, 2021, and the entire content of such application is incorporated herein by reference.

FIELD OF THE APPLICATION

This application relates to the field of concrete structure repair, and more specifically, to a wrap, system, and method for repairing gas station fuel pump islands, and the like.

BACKGROUND

A fuel pump island is generally that portion of an automobile or motor vehicle service station, gas station, public garage, or similar establishment for the sale of automotive fuels, that includes the fuel pumps, concrete base, overhead canopy and kiosk, but does not generally include any part of any building for the repair or service of automobiles or motor vehicles. Fire codes generally require that fuel dispensers be mounted on concrete islands or otherwise protected against collision from vehicles. As such, a fuel pump island generally includes an elevated concrete platform, usually from 4 to 8 inches high, on which fuel dispensing pumps are located. The side walls of the elevated concrete platform may be wrapped or fitted with a metal band or form to improve longevity of the platform.

Over time the concrete and metal bands forming a fuel pump island may break down from weathering, rust, vehicular impacts, fuel spills, etc. When this happens, the fuel pump island will require replacement, refurbishment, or repair. This repair will typically require breaking out existing concrete, removing fuel pumps, cutting out the old metal band, inserting a new metal band, pouring new concrete, and reinstalling the fuel pumps. This is problematic for service station operators as the cost for making such repairs using exiting methods can be quite high especially if the entire fuel pump island requires replacement. Another problem, with high associated costs, is the two or three day downtime of the fuel pump that such repairs may require.

A need therefore exists for an improved method and system for repairing fuel pump islands and the like. Accordingly, a solution that addresses, at least in part, the above and other shortcomings is desired.

SUMMARY OF THE APPLICATION

According to one aspect of the application, there is provided a method for repairing a damaged band of a fuel pump island, comprising: selecting among preformed band pieces to form a replacement band system for the fuel pump island, wherein the preformed band pieces include one or more of a straight band piece for covering a straight portion of a vertical wall of the fuel pump island, an outside corner band piece for covering an outside corner portion of the vertical wall of the fuel pump island, and an inside corner band piece for covering an inside corner portion of the vertical wall of the fuel pump island; preparing the fuel pump island by removing debris from the vertical wall and a top surface of the fuel pump island; installing the replacement band system over the damaged band of the fuel pump island by attaching respective wall portions of the preformed band pieces to the vertical wall of the fuel pump island; and, finishing a top surface of the fuel pump island to at least a height that is level with top surfaces of respective flange portions of the preformed band pieces.

According to another aspect of the application, there is provided a replacement band system for repairing a damaged band of a fuel pump island, comprising: one or more preformed band pieces, wherein the preformed band pieces include one or more of a straight band piece for covering a straight portion of a vertical wall of the fuel pump island, an outside corner band piece for covering an outside corner portion of the vertical wall of the fuel pump island, and an inside corner band piece for covering an inside corner portion of the vertical wall of the fuel pump island; wherein the replacement band system is installed over the damaged band of the fuel pump island by attaching respective wall portions of the preformed band pieces to the vertical wall of the fuel pump island.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the application. In some instances, certain structures, techniques and methods have not been described or shown in detail in order not to obscure the application.

Figure 1:
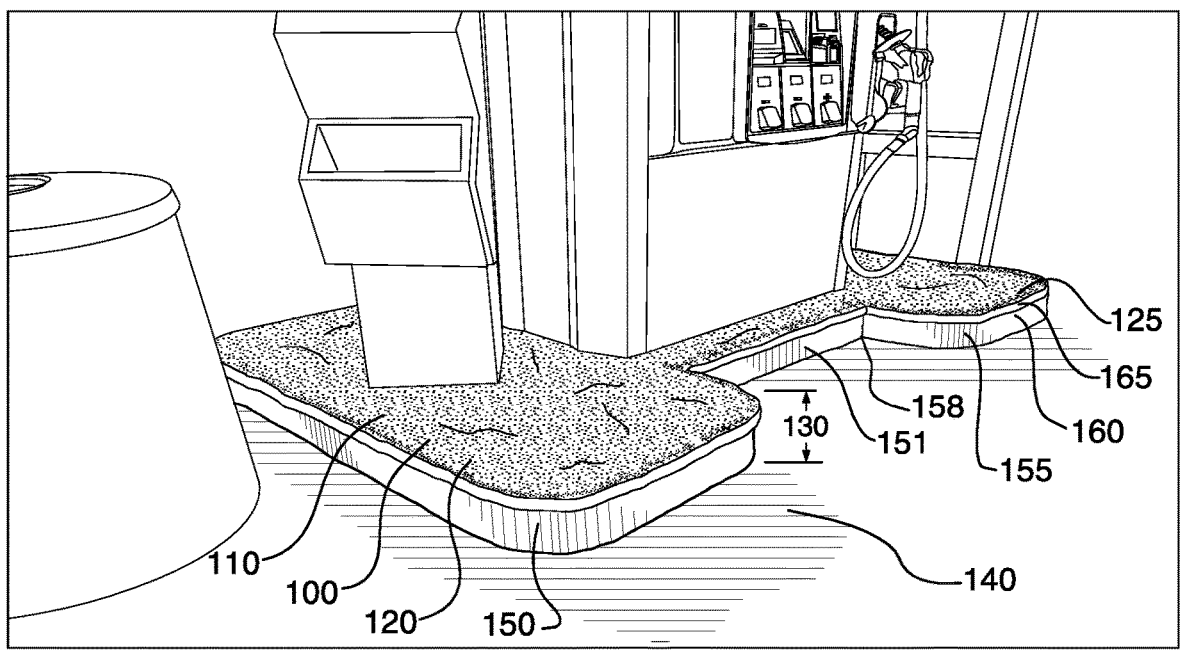
FIG. 1 is a front perspective view illustrating an example fuel pump island before repair in accordance with the prior art.

FIG. 1 is a front perspective view illustrating an example fuel pump island 100 before repair in accordance with the prior art. The fuel pump island 100 includes a concrete platform 110 having a top surface 120 which is elevated at a height 130 above grade 140. A vertical (or approximately vertical) wall 150 of the platform 110 is wrapped or formed with a metal band 160 (i.e., an existing or damaged band). The top surface 120 has an edge portion 125 proximate the metal band 160.

Figure 2:
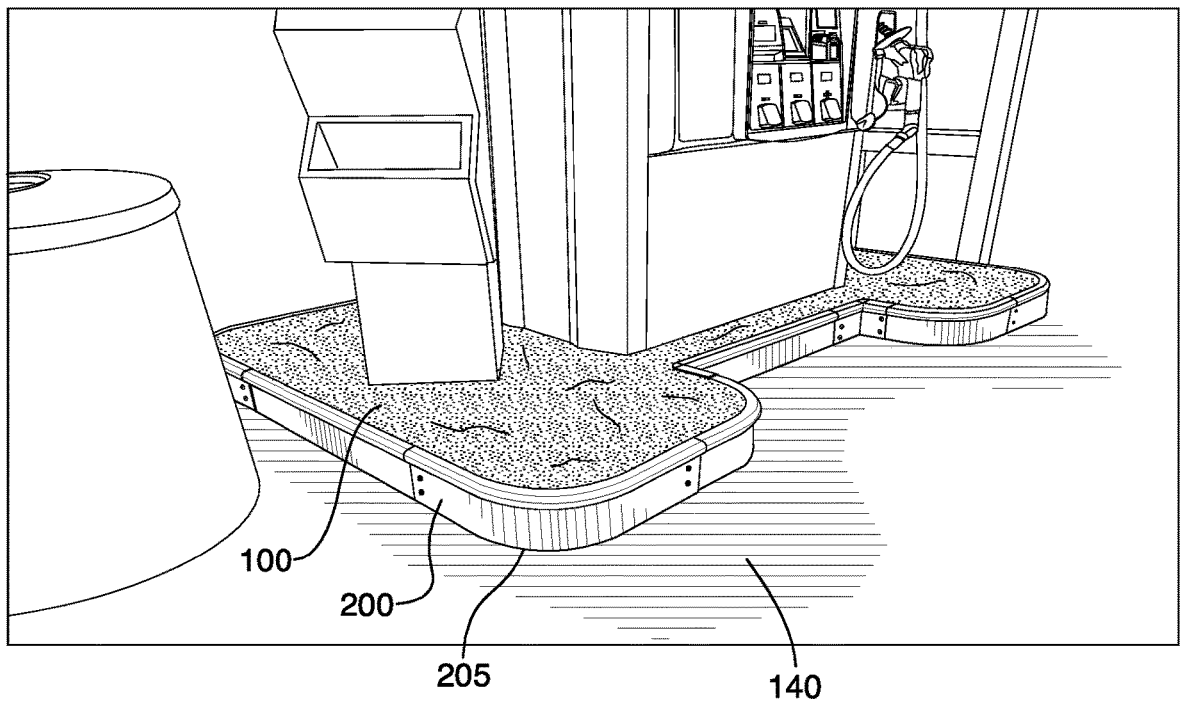
FIG. 2 is a front perspective view illustrating the example fuel pump island of FIG. 1 during repair in accordance with an embodiment of the application.

FIG. 2 is a front perspective view illustrating the example fuel pump island 100 of FIG. 1 during repair in accordance with an embodiment of the application. The repair of the fuel pump island 100 is accomplished by the installation of a replacement band (or wrap or band system) 200 over the existing band 160 of the fuel pump island 100 as will be described further below. Prior to the installation of the replacement band system 200, any debris and rust is removed from the fuel pump island 100 and the existing band 160, the existing band 160 is straightened if required, and any damaged concrete is repaired.

Figure 3:
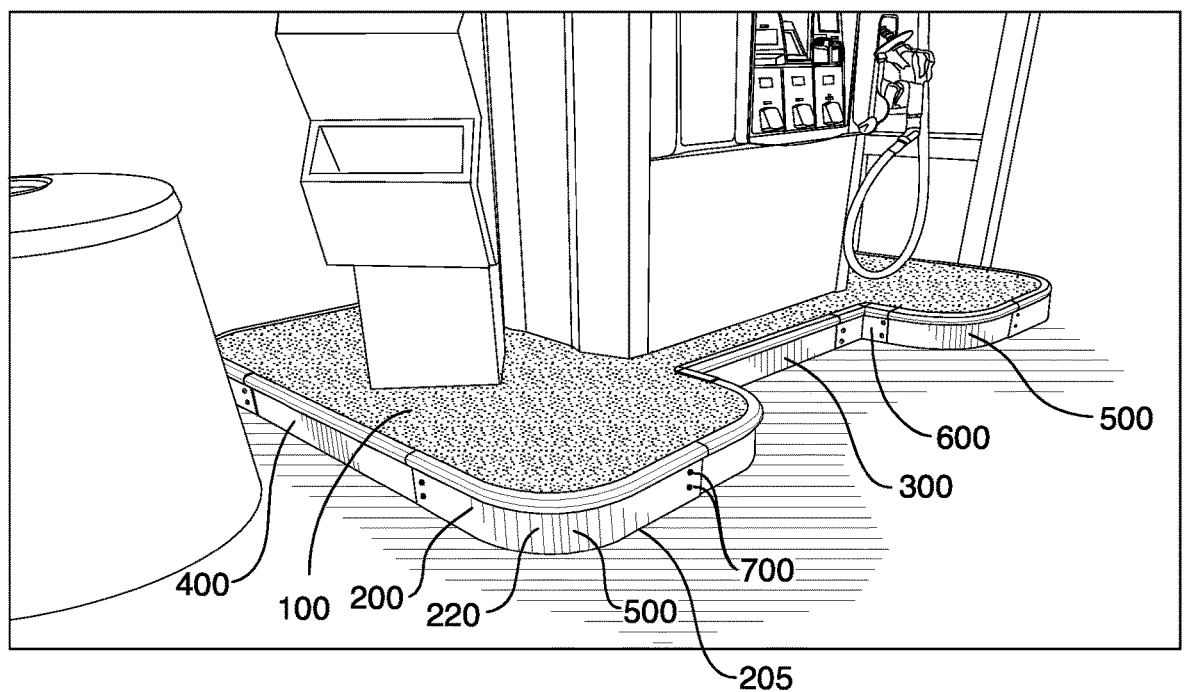
FIG. 3 is a front perspective view illustrating the example fuel pump island of FIG. 1 after repair in accordance with an embodiment of the application.

FIG. 3 is a front perspective view illustrating the example fuel pump island 100 of FIG. 1 after repair in accordance with an embodiment of the application. The repair of the fuel pump island 100 is completed by finishing the top surface 120 of the fuel pump island 100 with materials such as concrete, paint, clear coat epoxy, sealant, caulking, etc., to fill any gaps between the top surface 120 of the fuel pump island 100 and the replacement band system 200. Similarly, any gaps between the replacement band system 200 and the vertical wall 150 of the fuel pump island 100 may also be filled. Also similarly, any gaps between the bottom edge 205 of the replacement band system 200 and grade 140 may also be filled.

The replacement band system 200 includes a number of preformed band pieces 220 that are selected to provide a precise fit over the existing band 160 of the fuel pump island 100. According to one embodiment, the preformed band pieces 220 may be made from a corrosion resistant metal such as stainless steel. According to one embodiment, the preformed band pieces 220 may be attached to the fuel pump island 100 using fasteners 700 such as stainless steel screw anchors (e.g., Tapcon™ 3/16 inch screw anchors), concrete screws, concrete nails, nuts and bolts, or the like.

The preformed band pieces 220 may include one or more of the following: a straight band piece 300; a non-punched straight band piece 400; a curved outside corner band piece 500; and, an inside 90 degree corner band piece 600. Of course the preformed band pieces 220 may include other pieces such as, for example, 30, 45, and 60 degree inside corner band pieces and 120, 135, and 150 degree outside corner band pieces, to suit fuel pump islands 100 having different shapes or geometries.

Figure 4:
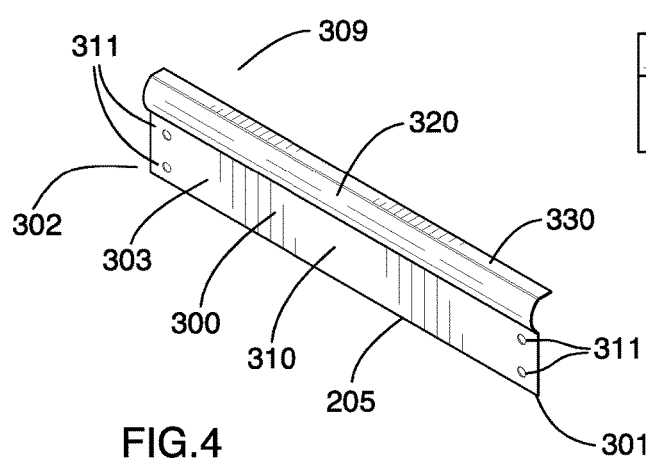
FIG. 4 is a front perspective view illustrating a straight band piece in accordance with an embodiment of the application.
Figure 5:
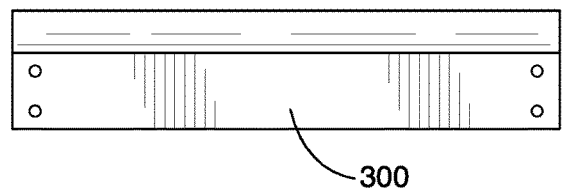
FIG. 5 is a front view thereof.
Figure 6:
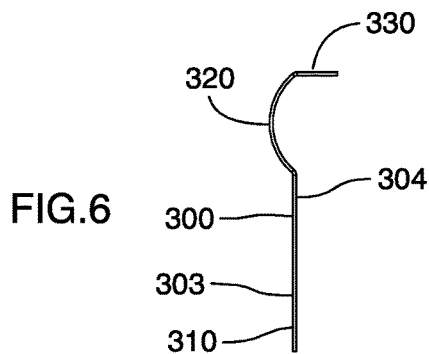
FIG. 6 is right side view thereof, the left side view being substantially a mirror image thereof.

FIG. 4 is a front perspective view illustrating a straight band piece 300 in accordance with an embodiment of the application. FIG. 5 is a front view thereof. FIG. 6 is right side view thereof, the left side view being substantially a mirror image thereof. And, FIG. 7 is a front view thereof shown in an unfolded (or pre-folded) condition 307.

The straight (or approximately straight) band piece 300 is used for wrapping straight (or approximately straight) portions (e.g., 151) of the vertical wall 150 of the platform 110 of the fuel pump island 100.

According to one embodiment, the straight band piece 300 is elongate having a first (or right) end 301, a second (or left) end 302, an outer surface 303 for facing away from the vertical wall 150 of the fuel pump island 100, an inner surface 304 for facing toward the vertical wall 150 of the fuel pump island 100, a wall portion 310, a bullnose portion 320 attached to the wall portion 310, and a flange portion 330 attached to the bullnose portion 320. The wall portion 310 has one or more holes 311 formed therein for receiving fasteners 700 for attaching the wall portion 310 to the vertical wall 150 of the fuel pump island 100. The one or more holes 311 may be positioned proximate the ends 301, 302 of the straight band piece 300. According to one embodiment, two holes 311 may be arranged vertically (or approximately vertically) at each end 301, 302 of the straight band piece 300. The flange portion 330 extends horizontally (or approximately horizontally) from the bullnose portion 320 and is for extending over the top edge 165 of the existing band 160 and the adjacent top edge portion 125 of the top surface 120 of the fuel pump island 100 when installed.

Figure 7:
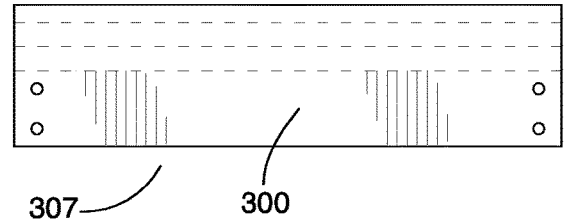
FIG. 7 is a front view thereof shown in an unfolded (or pre-folded) condition.

According to one embodiment, the straight band piece 300 may be initially formed from a flat piece of metal in an unfolded (or pre-folded) condition 307 as shown in FIG. 7. The straight band piece 300 may then be folded (or bent, formed, molded, etc.) into its final folded form 309 as shown in FIG. 4.

Figure 8:
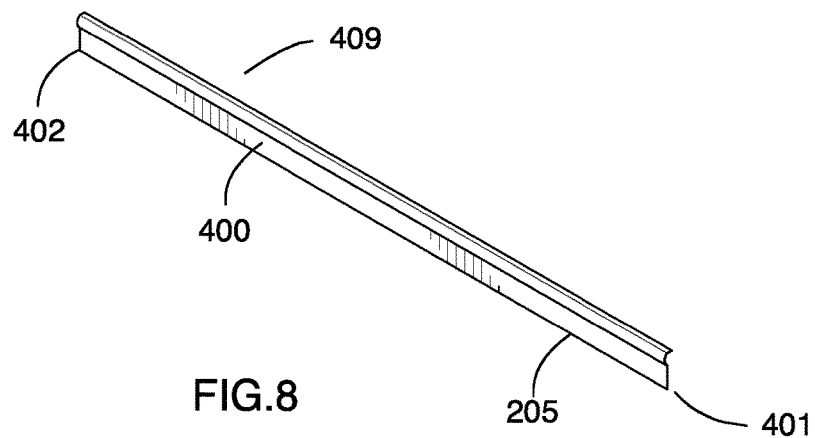
FIG. 8 is a front perspective view illustrating a non-punched straight band piece in accordance with an embodiment of the application.
Figure 10:
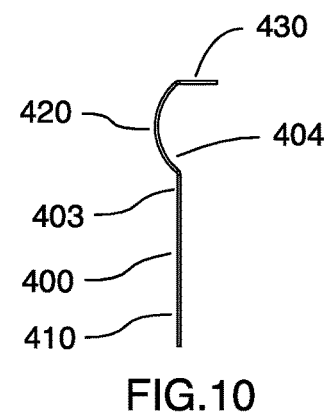
FIG. 10 is right side view thereof, the left side view being substantially a mirror image thereof.
Figure 9:
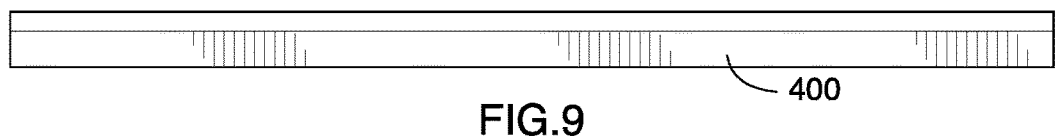
FIG. 9 is a front view thereof.
Figure 11:
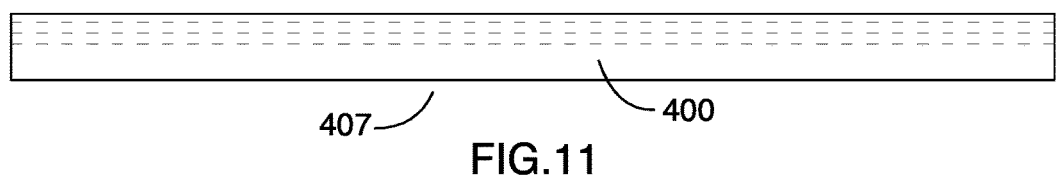
FIG. 11 is a front view thereof shown in an unfolded (or pre-folded) condition.

FIG. 8 is a front perspective view illustrating a non-punched straight band piece 400 in accordance with an embodiment of the application. FIG. 9 is a front view thereof. FIG. 10 is right side view thereof, the left side view being substantially a mirror image thereof. And, FIG. 11 is a front view thereof shown in an unfolded (or pre-folded) condition 407.

Similar to the straight band piece 300, the non-punched straight (or approximately straight) band piece 400 is used for wrapping straight (or approximately straight) portions (e.g., 151) of the vertical wall 150 of the platform 110 of the fuel pump island 100.

According to one embodiment, the non-punched straight band piece 400 is elongate having a first (or right) end 401, a second (or left) end 402, an outer surface 403 for facing away from the vertical wall 150 of the fuel pump island 100, an inner surface 404 for facing toward the vertical wall 150 of the fuel pump island 100, a wall portion 410, a bullnose portion 420, and a flange portion 430. The wall portion 410 does not initially have holes (e.g., 311) formed therein. Rather, one or more holes 311 may be formed therein for receiving fasteners 700 for attaching the wall portion 310 to the vertical wall 150 of the fuel pump island 100 during installation. The flange portion 430 extends horizontally (or approximately horizontally) from the bullnose portion 420 and is for extending over the top edge 165 of the existing band 160 and the adjacent top edge portion 125 of the top surface 120 of the fuel pump island 100 when installed.

According to one embodiment, the non-punched straight band piece 400 may be initially formed from a flat piece of metal in an unfolded (or pre-folded) condition 407 as shown in FIG. 8. The non-punched straight band piece 400 may then be folded (or bent, formed, molded, etc.) into its final folded form 409 as shown in FIG. 4.

Figure 12:
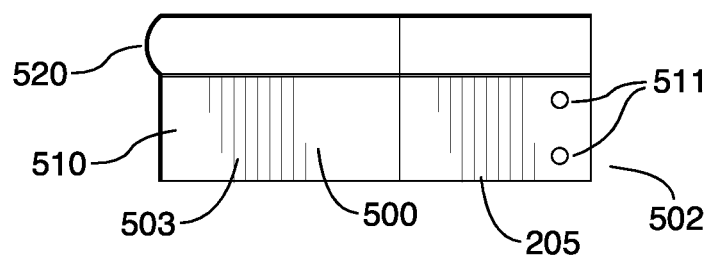
FIG. 12 is a left side view illustrating a curved outside corner band piece in accordance with an embodiment of the application.
Figure 13:
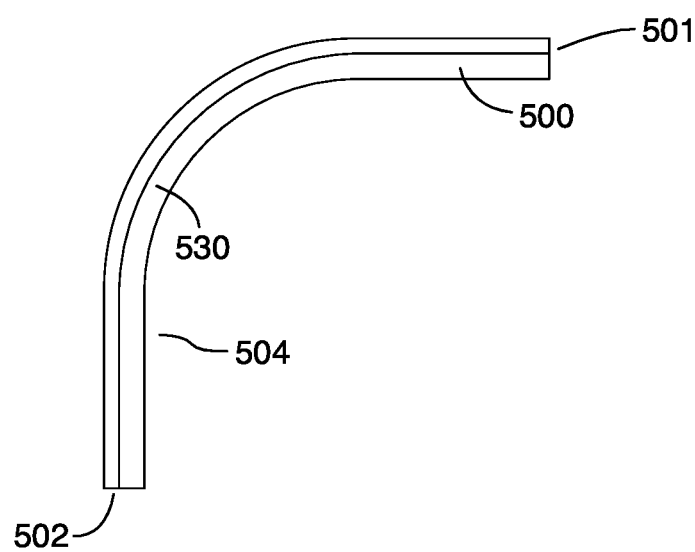
FIG. 13 is a top view thereof.

FIG. 12 is a left side view illustrating a curved outside corner band piece 500 in accordance with an embodiment of the application. And, FIG. 13 is a top view thereof.

The curved outside corner band piece 500 is used for wrapping curved outside corner portions (e.g., 155) of the vertical wall 150 of the platform 110 of the fuel pump island 100.

According to one embodiment, the curved outside corner band piece 500 has a first (or right) end 501, a second (or left) end 502, an outer surface 503 for facing away from the vertical wall 150 of the fuel pump island 100, an inner surface 504 for facing toward the vertical wall 150 of the fuel pump island 100, a wall portion 510, a bullnose portion 520, and a flange portion 530. The wall portion 510 has one or more holes 511 formed therein for receiving fasteners 700 for attaching the wall portion 510 to the vertical wall 150 of the fuel pump island 100. The one or more holes 511 may be positioned proximate the ends 501, 502 of the curved outside corner band piece 500. According to one embodiment, two holes 511 may be arranged vertically at each end 501, 502 of the curved outside corner band piece 500. The flange portion 530 extends horizontally (or approximately horizontally) from the bullnose portion 520 and is for extending over the top edge 165 of the existing band 160 and the adjacent top edge portion 125 of the top surface 120 of the fuel pump island 100 when installed.

Figure 14:
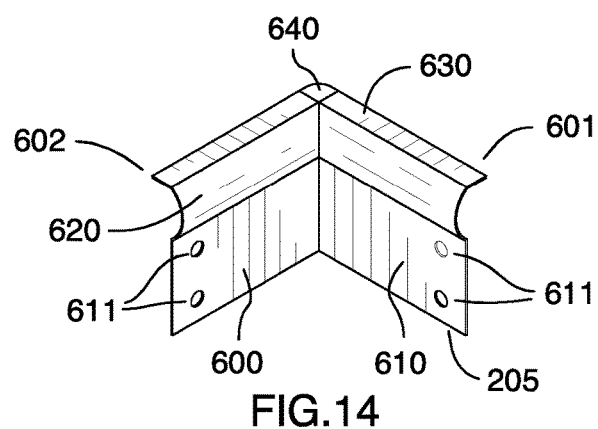
FIG. 14 is a front perspective view illustrating a 90 degree inside corner band piece in accordance with an embodiment of the application.
Figure 15:
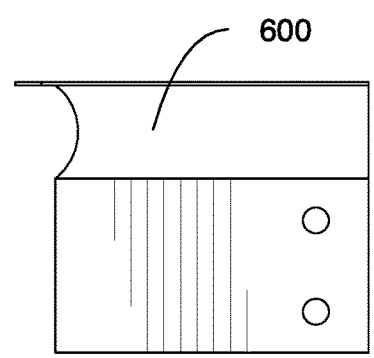
FIG. 15 is a left side view thereof.
Figure 16:
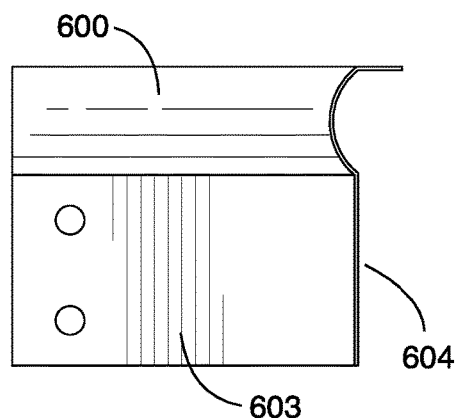
FIG. 16 is a right side view thereof.
Figure 17:
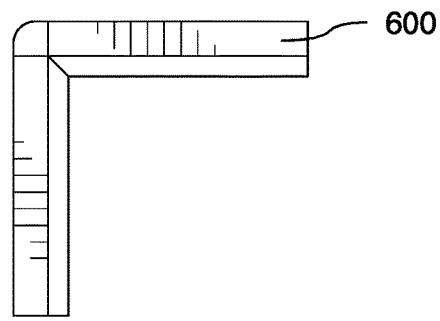
FIG. 17 is a top view thereof.
Figure 18:
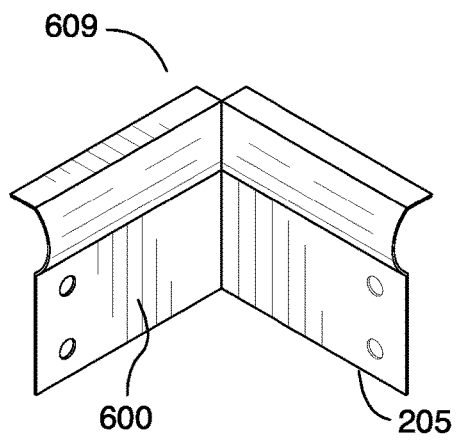
FIG. 18 is a front perspective view thereof with a corner infill piece thereof removed in accordance with an embodiment of the application.
Figure 19:
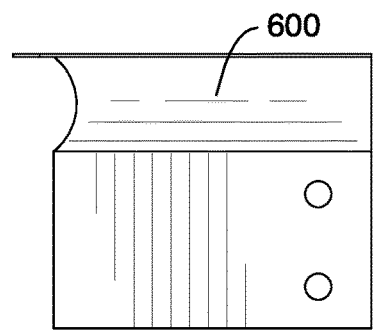
FIG. 19 is a left side view thereof.
Figure 20:
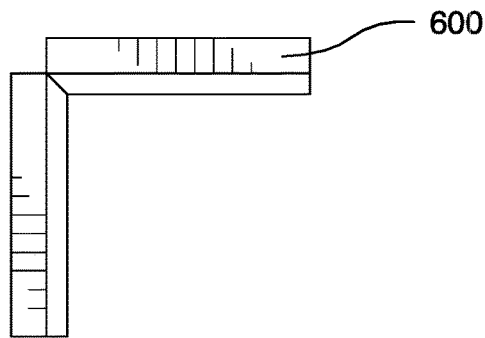
FIG. 20 is a top view thereof.
Figure 21:
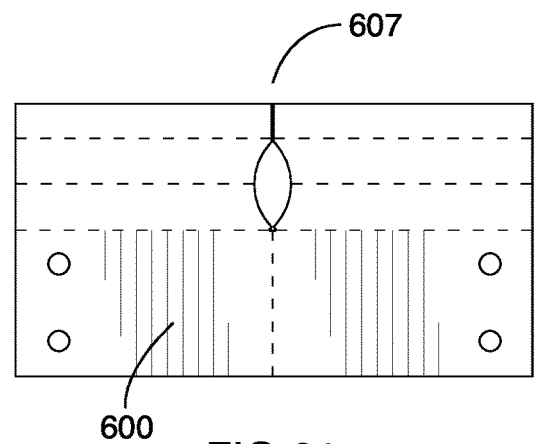
FIG. 21 is a front view thereof shown in an unfolded (or pre-folded) condition.
Figure 22:
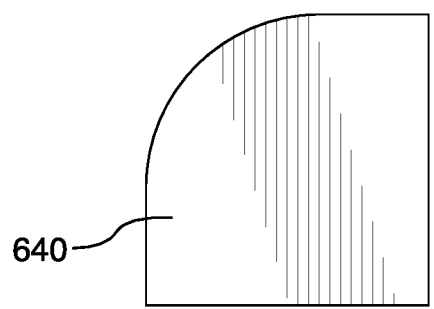
FIG. 22 is a top view illustrating a corner infill piece of the 90 degree inside corner piece of FIG. 14 in isolation in accordance with an embodiment of the application.
Figure 23:
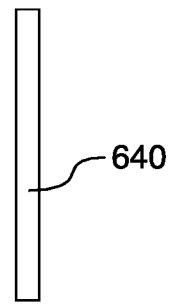
FIG. 23 is a right side end view thereof, the lower side end view being substantially a mirror image thereof; and, FIG. 24 is a front perspective view illustrating the example fuel pump island of FIG. 1 after repair in accordance with another embodiment of the application.

FIG. 14 is a front perspective view illustrating a 90 degree inside corner band piece 600 in accordance with an embodiment of the application. FIG. 15 is a left side view thereof. FIG. 16 is a right side view thereof. FIG. 17 is a top view thereof. FIG. 18 is a front perspective view thereof with a corner infill piece 640 thereof removed in accordance with an embodiment of the application. FIG. 19 is a left side view thereof. FIG. 20 is a top view thereof. FIG. 21 is a front view thereof shown in an unfolded (or pre-folded) condition 607. FIG. 22 is a top view illustrating a corner infill piece 640 of the 90 degree inside corner piece 600 of FIG. 14 in isolation in accordance with an embodiment of the application. And, FIG. 23 is a right side end view thereof, the lower side end view being substantially a mirror image thereof.

The 90 degree (or approximately 90 degree) inside corner band piece 600 is used for wrapping 90 degree (or approximately 90 degree) inside corner portions (e.g., 158) of the vertical wall 150 of the platform 110 of the fuel pump island 100.

According to one embodiment, the 90 degree inside corner piece 600 has a first (or right) end 601, a second (or left) end 602, an outer surface 603 for facing away from the vertical wall 150 of the fuel pump island 100, an inner surface 604 for facing toward the vertical wall 150 of the fuel pump island 100, a wall portion 610, a bullnose portion 620, and a flange portion 630. The wall portion 610 has one or more holes 611 formed therein for receiving fasteners 700 for attaching the wall portion 610 to the vertical wall 150 of the fuel pump island 100. The one or more holes 611 may be positioned proximate the ends 601, 602 of the 90 degree inside corner band piece 600. According to one embodiment, two holes 611 may be arranged vertically at each end 601, 602 of the 90 degree inside corner band piece 600. The flange portion 630 extends horizontally (or approximately horizontally) from the bullnose portion 620 and is for extending over the top edge 165 of the existing band 160 and the adjacent top edge portion 125 of the top surface 120 of the fuel pump island 100 when installed.

According to one embodiment, the 90 degree inside corner band piece 600 may be initially formed from a flat piece of metal in an unfolded (or pre-folded) condition 607 as shown in FIG. 21. The 90 degree inside corner band piece 600 may then be folded (or bent, formed, molded, etc.) into its final folded form 609 as shown in FIG. 18 and may be completed by the attachment (e.g., welding, etc.) of a corner fill piece 640 as shown in FIG. 14. According to one embodiment, the corner fill piece 640 may be seamlessly formed with the 90 degree inside corner piece 600 (e.g., the 90 degree inside corner piece 600 may consist of one piece only).

As shown in FIGS. 2 and 3, according to one embodiment, the ends 301, 302, 601, 602 of the curved outside corner band pieces 300 and the 90 degree inside corner band pieces 600 are installed so as to overlap the ends 401, 402, 501, 502 of intervening straight and non-punched straight band pieces 400, 500. In other words, the straight and non-punched straight band pieces 400, 500 are installed first. At least the straight and non-punched straight band pieces 400, 500 may be cut to required length on site.

According to one embodiment, the straight band piece 300 may have a length of 24 inches (or approximately 24 inches) and a height of 5.2 inches (or approximately 5.2 inches), the non-punched straight band piece 400 may have a length of 96 inches (or approximately 96 inches) and a height of 5.2 inches (or approximately 5.2 inches), the curved outside corner band piece 500 may have a length (i.e., side length) of 13.5 inches (or approximately 13.5 inches) and a height of 5.2 inches (or approximately 5.2 inches), and the 90 degree inside corner band piece 600 may have a length (i.e., side length) of 6.8 inches (or approximately 6.8 inches) and a height of 5.2 inches (or approximately 5.2 inches).

Figure 24:
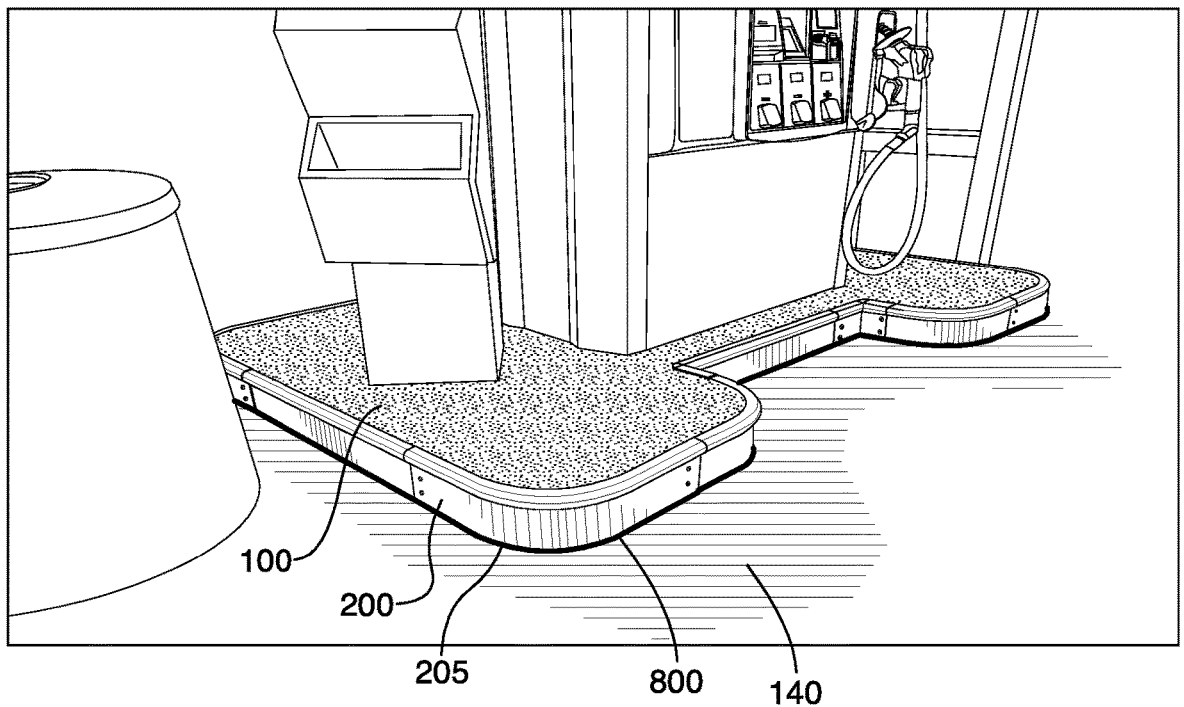

FIG. 24 is a front perspective view illustrating the example fuel pump island 100 of FIG. 1 after repair in accordance with another embodiment of the application. According to one embodiment, a gasket 800 is installed over (or partially over or proximate to or on) the bottom edge 205 of the replacement band system 200 (i.e., over respective bottom edges 205 of the preformed band pieces 220) to fill any gaps between the bottom edge 205 and grade 140 and to provide a more finished look for the repair. The gasket 800 may be made of rubber or similar material, may be U-shaped in cross section, and may be ⅛ inches (or approximately ⅛ inches) thick by 7/16 inches (or approximately 7/16 inches) high. The gasket 800 may extend from the outer surface (e.g., 303) of the preformed band piece 220 (proximate the bottom edge 205) over the bottom edge 205 to the inner surface (e.g., 304) of the preformed band piece 220 (proximate the bottom edge 205). Respective gaskets 800 (or a single lengthy gasket 800) may slip onto or over (or partially over or proximate to) the bottom edges 205 of the preformed band pieces 220 as they are fastened to the fuel pump island 100. Alternatively, one or more of the preformed band pieces 220 may have respective gaskets 800 preinstalled on (or over or partially over or proximate to) their bottom edges 205 prior to installation on the fuel pump island 100.

In operation, a damaged band 160 of a fuel pump island 100 may be repaired by the following method (or process) steps. First, a replacement band system (or band or wrap) 200 for the fuel pump island 100 may be formed by selecting from among preformed band pieces 220. The preformed band pieces 220 may include one or more of a straight (or approximately straight) band piece 300, 400 for covering a straight (or approximately straight) portion (e.g., 151) of a vertical (or approximately vertical) wall 150 of the fuel pump island 100, an outside corner band piece 500 for covering an outside corner portion (e.g., 155) of the vertical wall 150 of the fuel pump island 100, and an inside corner band piece 600 for covering an inside corner portion (e.g., 158) of the vertical wall 150 of the fuel pump island 100. Second, the fuel pump island 100 is prepared by removing debris from the vertical wall 150 and a top surface 120 of the fuel pump island 100. Third, the replacement band system 200 is installed over the damaged band 160 of the fuel pump island 100 by attaching respective wall portions 310, 410, 510, 610 of the preformed band pieces 220 to the vertical wall 150 of the fuel pump island 100. Fourth, the top surface 120 of the fuel pump island is finished to at least a height that is level with top (or outer) surfaces 304, 404, 504, 604 of respective flange portions 330, 430, 530, 630 of the preformed band pieces 220.

In the above method, the outside corner band piece 500 may be a curved outside corner band piece. The inside corner band piece 600 may be a 90 degree (or approximately 90 degree) inside corner band piece. The preformed band pieces 220 may be made from a corrosion resistant metal. The corrosion resistant metal may be stainless steel. The preformed band pieces 220 may each include a wall portion 310, 410, 510, 610, a bullnose portion 320, 420, 520, 620, and a flange portion 330, 430, 530, 630. The preformed band pieces 220 may be attached to the vertical wall of the fuel pump island using one or more fasteners 700. The one or more fasteners 700 may be one or more stainless steel screw anchors. The one or more of the preformed band pieces 220 may have one or more holes 311, 511, 611 formed therein for receiving the one or more fasteners 700. The one or more holes 311, 511, 611 may be positioned at first 301, 501, 601 and second ends 302, 502, 602 of the one or more of the preformed band pieces 220. And, the method may further include installing or preinstalling a respective gasket 800 on or over (or partially over or proximate to) a respective bottom edge 205 of one or more of the preformed band pieces 220.

The above embodiments may contribute to an improved method and system repairing a damaged band 160 of a fuel pump island 100 and may provide one or more advantages. First, the replacement band system 200 provides the fuel pump island 100 with a clean fresh look. Second, existing fuel pumps need not be removed from the fuel pump island 100 prior to installation of the replacement band system 200. Third, use of the replacement band system 200 reduces the cost and downtime required for fuel pump island 100 repair.

The embodiments of the application described above are intended to be exemplary only. Those skilled in this art will understand that various modifications of detail may be made to these embodiments, all of which come within the scope of the application.

What is claimed is:

1. A method for repairing a damaged band of a fuel pump island, comprising:
    selecting among preformed band pieces to form a replacement band system for the fuel pump island, wherein the preformed band pieces include one or more of a straight band piece for covering a straight portion of a vertical wall of the fuel pump island, an outside corner band piece for covering an outside corner portion of the vertical wall of the fuel pump island, and an inside corner band piece for covering an inside corner portion of the vertical wall of the fuel pump island;
    preparing the fuel pump island by removing debris from the vertical wall and a top surface of the fuel pump island;
    installing the replacement band system over the damaged band of the fuel pump island by attaching respective wall portions of the preformed band pieces to the vertical wall of the fuel pump island; and,
    finishing a top surface of the fuel pump island to at least a height that is level with top surfaces of respective flange portions of the preformed band pieces.

2. The method of claim 1, wherein the outside corner band piece is a curved outside corner band piece.

3. The method of claim 1, wherein the inside corner band piece is a 90 degree inside corner band piece.

4. The method of claim 1, further comprising installing or preinstalling a respective gasket on or over a respective bottom edge of one or more of the preformed band pieces.

5. The method of claim 1, wherein the preformed band pieces each include a wall portion, a bullnose portion, and a flange portion.

6. The method of claim 1, wherein the preformed band pieces are made from a corrosion resistant metal.

7. The method of claim 6, wherein the corrosion resistant metal is stainless steel.

8. The method of claim 1, wherein the preformed band pieces are attached to the vertical wall of the fuel pump island using one or more fasteners.

9. The method of claim 8, wherein the one or more fasteners are one or more stainless steel screw anchors.

10. The method of claim 8, wherein one or more of the preformed band pieces have one or more holes formed therein for receiving the one or more fasteners; and, wherein the one or more holes are positioned at first and second ends of the one or more of the preformed band pieces.

11. A replacement band system for repairing a damaged band of a fuel pump island, comprising:
    one or more preformed band pieces, wherein the preformed band pieces include one or more of a straight band piece for covering a straight portion of a vertical wall of the fuel pump island, an outside corner band piece for covering an outside corner portion of the vertical wall of the fuel pump island, and an inside corner band piece for covering an inside corner portion of the vertical wall of the fuel pump island;
    wherein the replacement band system is installed over the damaged band of the fuel pump island by attaching respective wall portions of the preformed band pieces to the vertical wall of the fuel pump island.

12. The replacement band system of claim 11, wherein the outside corner band piece is a curved outside corner band piece.

13. The replacement band system of claim 11, wherein the inside corner band piece is a 90 degree or approximately 90 degree inside corner band piece.

14. The replacement band system of claim 11, wherein the preformed band pieces each include a wall portion, a bullnose portion, and a flange portion.

15. The replacement band system of claim 11, wherein a respective gasket is installed or preinstalled on or over a respective bottom edge of one or more of the preformed band pieces.

16. The replacement band system of claim 11, wherein the preformed band pieces are made from a corrosion resistant metal.

17. The replacement band system of claim 16, wherein the corrosion resistant metal is stainless steel.

18. The replacement band system of claim 11, wherein the preformed band pieces are attached to the vertical wall of the fuel pump island using one or more fasteners.

19. The replacement band system of claim 18, wherein the one or more fasteners are one or more stainless steel screw anchors.

20. The replacement band system of claim 18, wherein one or more of the preformed band pieces have one or more holes formed therein for receiving the one or more fasteners; and, wherein the one or more holes are positioned at first and second ends of the one or more of the preformed band pieces.

* * * * *